| United States Patent [19] | [11] Patent Number: 4,875,762 |
| Kato et al. | [45] Date of Patent: Oct. 24, 1989 |

[54] PHOTOCHROMIC-ELECTROCHROMIC INTERCALATION COMPOUND

[75] Inventors: Chuzo Kato; Kazuyuki Kuroda, both of Tokyo, Japan

[73] Assignee: Osaka Yuki Kagakuo Kogyo Kabushiki Kaisha, Osaka, Japan

[21] Appl. No.: 179,321

[22] Filed: Apr. 8, 1988

[30] Foreign Application Priority Data

Apr. 8, 1987 [JP] Japan .................................. 62-84622

[51] Int. Cl.$^4$ .............................................. G02F 1/17
[52] U.S. Cl. .................................................. 350/357
[58] Field of Search ........................ 350/353, 355, 357

[56] References Cited

U.S. PATENT DOCUMENTS 4,182,551 1/1980 Washida et al. ..................... 350/357
4,526,441 7/1985 Dowden et al. ..................... 350/357

OTHER PUBLICATIONS

Oliver Poizat, C. Sourisseau, and Y. Matley, J. Chem. Soc., Faraday Trans. I, 80, pp. 3257-3274, 1984.
M. H. B. Hayes, M. E. Pick and B. A. Thoms, J. Colloid Interface Sci., vol. 64, No. 2, pp. 254-265, Jun. 1978.
M. H. B. Hayes, M. E. Pick and B. A. Thoms, J. Colloid Interface Sci., vol. 65, No. 2, pp. 266-275, Jun. 1978.
M. Raupach, W. M. Emerson, and P. G. Slade, J. Colloid Interface Sci., vol. 69, No. 3, pp. 398-408, May 1979.
O. D. Philen Jr., S. B. Weed, and J. B. Weber, Clays and Clay Minerals, 1971, vol. 19, pp. 295-302.
N. Kambe, T. Yamada, Mater. Res. Soc. Symp. Proc., 1984, pp. 467-473.

*Primary Examiner*—Eugene R. LaRoche
*Assistant Examiner*—Nathan W. McCutcheon
*Attorney, Agent, or Firm*—Armstrong, Nikaido, Marmelstein, Kubovcik & Murray

[57] ABSTRACT

A compound is disclosed which excels in thermal resistance and acidproofness, fits application on a surface and fabrication, and exhibits both photochromism and electrochromism.

6 Claims, No Drawings

PHOTOCHROMIC-ELECTROCHROMIC INTERCALATION COMPOUND

BACKGROUND OF THE INVENTION

Generally, many organic compounds have been known as substances that manifest photochromism and electrochromism. The term "photochromism" as used herein refers to a phenomenon that a substance, on exposure to light, emits color or changes color and, on release from the stimulus or exposure to other form of energy, regains the original state thereof and the term "electrochromism" refers to a phenomenon that a substance, when a voltage is applied thereto or a current is passed therethrough, changes color.

The aforementioned organic compounds manifesting photochromism and electrochromism [hereinafter referred to as "color-generating (or color-changing) organic compounds"] are so deficient in thermal resistance and acidproofness that they succumb to degradation of quality after exposure to repeated cycles of alternate oxidation and reduction in the air and, when spread on a surface, they are liable to produce minute crystals and are unfit as coating materials which are expected to produce smooth coatings.

BRIEF SUMMARY OF THE INVENTION

This invention is directed to a compound which is produced by intercalating a color-generating (color-changing) organic compound, when necessary, in combination with an electron donor, between crystal layers of an inorganic substance possesing a stratified structure and which, therefore, is allowed to manifest the thermal resistance and the acidproofness of the color-generating (color-changing) organic compound to a notably increased level.

DETAILED DESCRIPTION OF THE INVENTION

The inventors made a diligent study for the purpose of improving the thermal resistance and the acidproofness of the conventional color-generating (color-changing) organic compound to a level appreciably high from the practical point of view. This invention has been perfected as the result.

Specifically, this invention relates to an intercalation compound using as a host thereof an organic substance possessing a stratified structure and as a guest a color-generating (color-changing) organic compound and having the molecule of the host, optionally in combination with an electron donor dependent on the kind of the host, intercalated between the crystal layers of the host.

The compound of the present invention, compared with the conventional color-generating (color-changing) organic compound used alone, enjoys the following advantages:

(1) The compound is not susceptible to the influences of heat and acids and therefore exhibits high thermal stability and high acidproofness because the crystals of the organic substance enclose the periphery of the color-generating (color-changing) organic compound.

(2) Where a compound possessing the nature of a semiconductor is employed as the inorganic substance serving the part of the host, the compound of this invention does not require intercalation of any electron donor in the host to manifest the phenomenon of photochromism on exposure to an ultraviolet, visible, or infrared ray.

(3) By sealing off the opposite ends between the layers of the inorganic substance of the stratified structure with some other substance, the compound is enabled to retain permanently the hue produced by color generation. In order for the compound to effect generation and erasure of color reversibly, it suffices to have the opposite ends between the layers of the inorganic substance kept in an open state.

(4) The compound of this invention can be easily molded in the form of a thin coating or film or applied to a surface because the color-generating (color-changing) organic substance is intercalated in the inorganic substance possessing a stratified structure. It can be utilized, therefore, as processed paper and processed cloth having the compound stably deposited on paper and cloth and as color-generating (color-changing) displays, color copies, and optical memories.

Now, the component compounds of which the compound of the present invention is formed will be described in detail below.

The host and the guest for use in the production of the compound of the present invention are not selected at random. The guest must be such that the molecule thereof possesses a size fit for intercalation between the crystal layers of the host. Where the space intervening between the crystal layers of the host is small as compared with the molecule of the guest, the host must be given a pretreatment for widening the intervening space by the use of a separate molecule of larger size.

The inorganic substances of stratified structure available as a host in the present invention can be divided under two classes, i.e. natural clayish minerals and transition metal oxides and their salts.

The natural clayish minerals include montmorillonite, kaolinite, halloysite, and vermiculite, for example. Since montmorillonite is one type of smectite capable of swelling with absorbed water and increasing the intervening space between the crystal layers thereof, it permits the molecule of the guest to be intercalated therein relatively easily. In contrast, kaolinite and halloysite do not permit intercalation therein of the molecule of the guest until after the intervenig space between the crystal layers thereof has been widened by the use of an entrainig agent such as dimethyl sulfoxide, hydrazine, formamide, or pyridine-N-oxide.

The transition metal oxides and their salts of stratified structure available as a host include oxides and salts of trasition metals such as 2-, 3-, and 4-titanates, titanoniobates tungsten trioxide, and molybdenum trioxide, for example.

Then, the color-generating (color-changing) organic compound to play the part of the guest can be any organic compound which manifests photochromism and electrochromism. As concrete examples of the organic compound which fills this requirement, there can be cited alkyl viologens, diphthalocyanine type compounds, antraquinone type compounds, metallocyanine type compounds, styryl type compounds, azomethine type compounds, and azo type compounds.

Now, the present invention will be described more specifically below with reference to working examples of the procedure followed for the manufacture of the compound of this invention.

The first example concerned production of the compound by the use of smectite, a natural clayish mineral, among other host substances possessing a stratified structure. The space intervening between the 001 planes of montmorillonite, one type of smectite, generally falls in the range of 12 to 18 Å, though variable with the water content of the mineral. The space intervening between the crystal layers of the mineral is in the range of 2 to 8 Å. In the present example, an alkyl viologen was used as a guest organic subsatnce to be intercalated between the crystal layers. As the alkyl group of the viologen, methyl group, heptyl group were used benzyl group, and phenetyl group were also used. Further, as an electron donor for effecting photoreduction on the viologen, polyvinyl pyrrolidone (PVP) was added to the viologen in advance.

The intercalation of the viologen between the layers of montmorillonite was carry out by the following method. Momtmorollonite was thoroughly swelled with water and then immersed in an aqueous sodium chloride solution to be converted into sodium ionic montmorillonite. The sodium ionic montmorillonite and PVP added thereto in an amount 1.5 times the weight of the montmorillonite were stirred to effect intercalation of PVP between the layers. This sample was washed with methanol and then thoroughly stirred with an alkyl viologen to effect intercalation of the viologen between the crystal layers and give rise to a viologen-PVP-montmorillonite intercalation compound. The amount of the alkyl viologen added herein was 0.5 to 2.0 times the equivalent weight based on the theoretical exchange amount of montmorillonite. The intercalation compound thus obtained was washed with methanol until the washings ceased to contain any detectable viologen. The synthetized intercalation compound was identified by X-ray analysis and infrared absoption analysis. In the infrared absorption spectrum of the montmorillonite-viologen intercalation compound, the absorption bands at 1,640 cm$^{-1}$ and 1,560 cm$^{-1}$ ascribable to the absorption by the vibration of the pyridine ring the viologen were confirmed.

Now, the example of the production of the compound by the use of a transition metal oxides possesing a stratified structure will be cited. As a host inorganic compound, a varying tetratitanate was used. Potassium tetratitanate ($K_2Ti_4O_9$), a potassium salt, possesses a structure in which $Ti_4O_9$ units formed by the linkage of four $TiO_6$ octahedrons are piled up in the direction of the axis, with potassium ions interposed between the layers. When potassium tetratitanate is treated with an acid, it is converted into tetratitanic acid, $H_2Ti_4O_9 \cdot H_2O$ possessing an ion-exchange capacity, through release of the potassium ions. The tetratitanic acid crystal is presumed to contain a Ti-O bond and manifest a quality resembling the quality of $TiO_2$. $TiO_2$ is an n-type semiconductor possessing a band gap of 3.0 eV. On exposure to a light having a wavelength shorter than 415 nm, the electron of this oxide in the valency electron band is excited. In accodance with the hypothetic mechanism described above, potassium tetratitanate was converted into tetratitanic acid by treatment with hydrochloric acid. The tetratitanic acid was caused to react with an aqueous n-propyl amine solution so as to effect intercalation of propyl ammonium ion in the interlayer. The composite thus obtained was washed with acetone and then caused to react with an aqueous methyl viologen solution to produce a tetratitanic acid-methyl viologen intercalation compound. The preparatory intercalation of the alkyl amine between the crystal layers of tetratitanic acid was meant to facilitate the intercalation of the alkyl viologen. This synthetic product was washed with methanol until the washings ceased to contain any detectable viologen. It was identified by the X-ray analysis and the infrared absorption spectrum.

The distance, $d_{200}$, between the layers of potassium tetratitanate is 8.8 Å. Owing to the treatment with the acid, it was changed to 8.6 Å. When n-propyl ammonium was intercalated in the product of the acid treatment, the value of $d_{200}$ increased from 8.6 Å. The infrared absorption spectrum of the tetratitanic acid-n-propyl ammonium composite showed an N-H deformation vibration at 1,570 cm$^{-1}$, a C-H deformation vibration at 1,460 cm$^{-1}$, and a C-N stretching vibration at 1,180 cm$^{-1}$, confirming that n-propyl ammonium had been intercalated in the composite. The n-propyl ammonium-tetratitanic acid composite was caused to react with methyl viologen to produce a tetracitanic acid-methyl viologen interlayer compound. The $d_{200}$ value of this compound was 12.2 Å. The infrared absorption spectrum of this compound showed pyridine ring vibrations one each at 1,640 cm$^{-1}$ and 1,560 cm$^{-1}$. Further, the elementary analysis gave 10.06% as C concentration and 1.98% as N concentration. All these data proved that methyl viologen had been intercalated in the interlayer compound.

Photochromism of momtmorillonite-violoben intercalation compound and tetratitanic acid-viologen intercalation compound synthesized as described above were thinly applied on an acryl resin plate and dried to produce films. When these films were exposed to the light from a 100-W mercury vapor lamp, the white to gray sample films both emitted a bright blue color. The process of color generation and the process of color erasure were studied along the course of time through measurement of absorbance at 607 nm. The tetratitanic acid-viologen intercalation compound, on exposure to the light, emitted a blue color. This color generation did not occur in the film of a montmorillonite-viologen intercalation compound in which no PVP had been intercalated. When PVP was intercalated, the film of this intercalation compound emitted a blue color. This contrast clearly indicates that PVP functioned as an electron donor. In the case of the tetratitanic acid-viologen intercalation compound, however, PVP was not requrired for color generation because $TiO_2$ was enabled by exposure to light to function as an n-type semiconductor. In the measurement of visible absorbance, there appeared an absorption characteristic of the viologen radical cation possessing maxima at 610 nm and 400 nm. In the alkyl viologens of propyl and heptyl groups, the absorption wavelengths bore resemblance.

During the process of color generation, the absorbance began to increase sharply with the start of irradiation of light and reached the maximum within two minutes of the light irradiation. Thereafter no further increase of the absorbance was recognized even when the light irradiation was continued. The length of the time of light irradiation required for the absorption to reach a fixed level increased in proportion as the thickness of the film increased. The absorption began to decrease as the irradiation of light was descontinued. The speed of this decrease was remarkably low as compared with the speed during the process of color generation. Even in a film of very small thickness, perfect erasure of color in the air required four to six hours of time. The length of time required for the erasure of color increased with the increasing thickness of the film. In a film of large thickness, the blue color persisted for several days. The erasure of color was notably accelerated when the film was exposed to forced supply of air or oxygen, indicating that the erasure of color was brought about by the oxidation with the oxygen in the air. The absorbance was not lowered even after 50 cycles of color generation and color erasure. When the film was covered with a transparent film such as of polyethylene and exposed to a light, the blue color assumed by the film remained unerasable semipermanently. From these results of the experiment, it is safely concluded that an interlayer compound formed between an inorganic substance possessing a stratified structure and viologen can be caused to generate color by exposure to a light and, therefore, can be used as a photorecording material and a display. Particularly in the case of tetratitanic acid, since this said is an n-type semiconductor, it is characterized by being able to generate color even in the absence of an electron donor. Since a color-generating organic compound is intercalated between the crystal layers of an inorganic substance of stratified structure and consequently kept in a protected state, the intercalation compound has an advantage that the thermal resistance and the acidproofness are enhanced.

Electrochromism of montmorillonite-viologen intercalation compound and tetratitanic acid-viologen intercalation compound: The substances which manifest electrchromism, a phenomenon of color generation caused by the formation of a coloring molecule or a color center due to the transfer of an electron to be brought about by application of an electric field, can be divided into two types, i.e. solid substances and liquid substances. When an intercalation compound between a clayish mineral or a titanic acid type compound possessing a stratified structure and viologen is subjected to application of an electric field, it undergoes oxidation-reduction and assumes a color without reference to distinction between the solid and liquid states. The intercalation compound is prepared as already described. In the molding of this compound in the form of film, polyvinyl alcohol may be added to the compound to improve the film-forming property of the compound. When the intercalation compound between the aforementioned clayish mineral or titanic acid type compound and viologen is applied on a tin oxide coated glass to form an modified electrode and subjected to application voltage, the electrode emitted a blue color. In this case, the following characteristics may be pointed out.

(A) By the intercalation of a liquid type viologen between the crystal layers of a solid substance possessing a staratified structure, there is obtained a solid element.

(B) Since the viologen is enclosed with the inorganic crystal layers, it enjoys improvement in thermal resistance and acidproofness and exhibits enhanced stability.

(C) The interlayer compound applied as on a tin oxide coated glass can be utilized as an ornamental electrode in displays and photomemories.

Now, the present invention will be described more specifically below with reference to working examples.

EXAMPLE 1:

Montmorillonite [ideal formula-$(Al_{1.67}Mg_{0.33})(Si_4)O_{10}(OH)_2Na_{0.33}.nH_2O$], a natural clayish mineral possessing a stratified structure, was produced from Aterazawa of Yamagata Ken (by Kunimine K.K.). Propyl viologen of reagent grade was secured in the market (product of Tokyo Kasei K.K.). The montmorillonite was thoroughly swelled with water and then stirred for 24 hours in an aqueous 3% sodium chloride solution to prepare sodium homoionic montmorillonite. In an aqueous solution of polyvinyl pyrrolidone (PVP) of an amount 1.5 times that of the sodium montmorillonite, this sodium montmorillonite was stirred for 48 hours to effect intercalation of PVP therein. Then resultant composite was washed several times with methanol, dried, pulverized, and dispersed in purified water. The resultant dispersion and an aqueous propyl viologen solution added thereto were stirred for 48 hours to effect reaction and prepare a montmorillonite-PVP-propyl viologen composite. The amount of propyl viologen added was 1.5 times the cation-exchange capacity of montmorillonite. The synthetic product thus obtained was passed through a filter, and washed until the washings ceased to contain any detectable viologen, to give rise to a montmorillonite-viologen intercalation compound meant as a sample. This synthetic sample was confirmed by X-ray analysis and infrared absorption spectrum to be a montmorillonite-PVP-viologen intercalation compound.

Then, this synthetic interlayer compound was applied thinly on an acryl resin plate and then dried to produce a film. When the film formed on the acryl resin plate was exposed to the light from a 100-W mercury vapor lamp, it emitted a bright blue color. In the measurement with a spectrophotometer, the film showed a characteristic absorption possessing maxima at 610 nm and 400 nm. When the film had a thickness of 0.1 mm, the blue color was immediately generated and the absorbance reached the maximum in 2 minutes and levelled off.

When this film was left standing in the air, the color ceased to exist in about 5 hours' time. When the film which had lost the color was again exposed to the light from the 100-W mercury vapor lamp, it immediately emitted a blue color. The intensity of the color thus generated was hardly attenuated even after the exposure to the light was repeated 30 times. In the case of a sample of this film interposed between two sheets of polyethylene film, the blue color generated by the exposure to the light from the mercury vapor lamp remained intact even after elapse of one month.

EXAMPLE 2:

A sample of the montomorillonite-PVP-viologen intercalation compound synthesized in Example 1 and was mixed with 5% by weight of polyvinyl alcohol possessing a polymerization degree of 500 and dispersed and swelled in water to produce a viscous suspension. The suspension was applied on a glass plate having a film of tin oxide deposited in advance thereon by sputtering, with platinum wires fixed at the opposite ends thereof with silver paste. When the resultant composite was placed in an electrolyte of sodium sulfate and subjected to application of a voltage of 6V, it emitted a white to blue color. It produced the process of color generation and color erasure in much the same way as in Example 1, indicating that it manifested electrochromism.

EXAMPLE 3:

Potassium tetratitanate (product of Otsuka Chemical) was selected as a host inorganic compound possessing a stratified structure and methyl viologen (reagent grade trihydrate having purity of not less than 98%, product of Tokyo Kasei Kogyo K.K.) as a color-generating guest organic compound. n-Propyl amine of reagent grade was secured from Tokyo Kasei Kogyo K.K.

At first tetratitanic acid was prepared by treating potassium tetratitanate with 1N hydrochloric acid of a volume 100 times as large at room temperature for three hours. This sample was washed with purified water until the washings ceased to contain any chlorine ion detectable with a silver nitrate solution. It was then dried at room temperature. Any elution of potassium by the acid treatment was confirmed by the flame analysis. The tetratitanic acid and an aqueous 50% n-propyl amine solution of a volume four times as large were mixed and sealed in an ampoule and allowed to reacting 60° C. for one week to effect intercalation of n-propyl ammonium ion. The synthetic product consequently obtained was thoroughly washed with acetone and dried at an elevated temperature. The dried synthetic product and an aqueous 1 M methyl viologen solution added thereto in an amount 10 times the theoretical ion-exchange capacity were jointly sealed in an ampoule and allowed to reacting 60° C. for two weeks. The resultant synthetic product was washed with methanol until the washings ceased to contain any methyl viologen detectable with a spectrophotometer and then dried at room temperature, to produce a tetratitanic acid-viologen intercalation compound meant as a sample. This synthetic sample was identified by X-ray analysis, infrared absorption analysis, and elementaly analysis. A sample of the synthetic titanic acid-viologen intercalation compound was dispersed in water. The suspension was thinly applied on an acryl resin plate. When the resultant film was exposed to the light from a 100-W mercury vapor lamp in an atmosphere of nitrogen gas, it generated a bright blue color. When the film was produced in a thickness of 0.1 mm, the spectrophotometer produced a spectrum showing absorption at 630 nm and 405 nm. The absorbance reached the maximum within 1 minute and then levelled off. Since this sample did not incorporate therein any substance capable of functioning as an electron donor, it is inferred that the host tetratitanic acid, an n-type semiconductor, was enabled to play the part of an electron donor owing to the exposure to light. The erasure of color was stable so long as the sample was not exposed to the air. When this sample was covered with a film impervious to oxygen, it retained the generated color in the air even after elapse of one month's time.

EXAMPLE 4:

The titanic acid-methyl viologen interlayer compound synthesized in Example 3 was mixed with 5% by weight of polyacryl amide possessing a polymerization degree of 500 dispersed and swelled in water to prepare a suspension. This suspension was applied on a tin oxide coated glass, with platinum wires fixed at the opposite ends thereof with silver paste. When the resultant composite was subjected to application of a voltage of 6V, it emitted a white to blue color. It produced the process of color generation and color erasure in much the same way as in Example 3, indicating that it manifested electrochromism.

What is claimed is:

1. A photochromic-electrochromic intercalation compound synthesized by intercalating an organic compound exhibiting photochromism and electrochromism in combination with an electron donor between crystal layers of a natural clayish material.

2. The compound of claim 1, wherein said natural clayish mineral is montmorillonite, kaolonite, halloysite or vermiculite.

3. The compound of claim 1, wherein said organic compound exhibiting photochromism and electrochromism is an alkyl viologen, a diphthalocyanine compound, a metallocyanine compound, a styryl compound, an azomethine compound or an azo compound.

4. A photochromic-electrochromic intercalation compound synthesized by intercalating an organic compound exhibiting photochromism and electrochromism between crystal layers of a transition metal oxide or a salt of a transition metal oxide.

5. The compound of claim 4, wherein said salt is a titanate or a molybdate.

6. The compound of claim 4, wherein said organic compound exhibiting photochromism and electrochromism is an alkyl viologen, a diphthalocyanine compound, a metallocyanine compound, a styryl compound, an azomethine compound or an azo compound.

* * * * *